United States Patent Office 3,452,611
Patented July 1, 1969

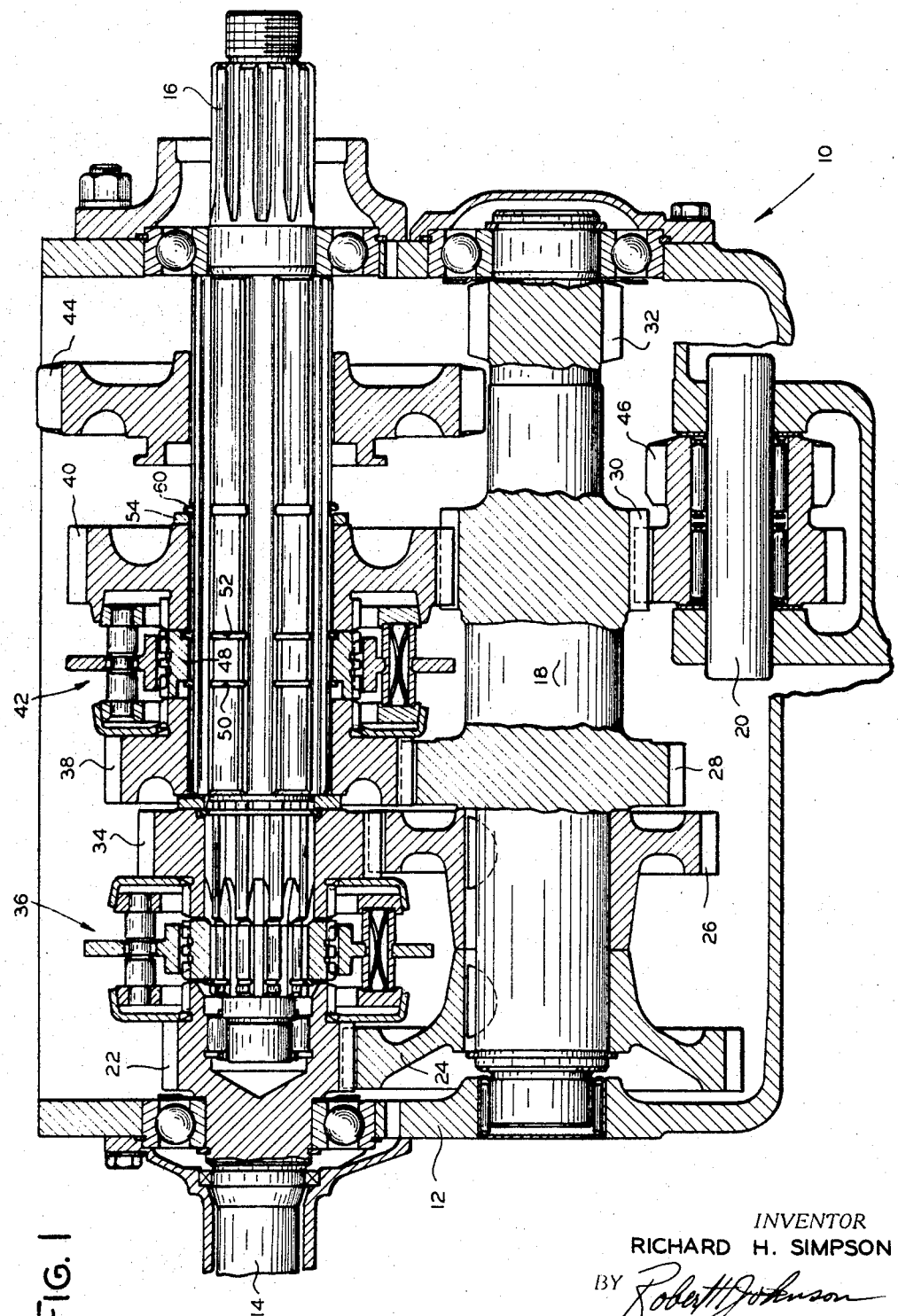

3,452,611
MOUNTING OF ROTATABLE GEAR ON
TRANSMISSION SHAFT
Richard H. Simpson, Jackson, Mich., assignor to Clark
Equipment Company, a corporation of Delaware
Filed Dec. 1, 1967, Ser. No. 687,292
Int. Cl. F16h 1/20, 3/08
U.S. Cl. 74—363                                   4 Claims

ABSTRACT OF THE DISCLOSURE

A gear transmission having multiple forward speed ratios and a reverse speed ratio. A plurality of gears are fixed to a countershaft and mesh with separate gears mounted for rotation on an output shaft to which they are connectible by clutches for conjoint rotation. One of the gear trains includes an idler gear in order to provide a reverse.

*Background of the invention*

The field of art to which the invention pertains includes machine elements and mechanisms and more specifically multiple forward and reverse gearing.

In many transmissions intended for relatively light duty it is common to mount a steel gear for rotation on a steel shaft without providing a bronze bushing or other type of bearing surface between the steel gear and the steel shaft. Lubricating oil, of course, is provided between the gear and shaft. Occasionally, there are seizures between the gear and shaft without any explanation as to why the seizure occurred. This has been a long standing problem with certain transmissions in which a steel gear is mounted for rotation on a steel shaft, and since it has not been possible heretofore to duplicate in the laboratory the conditions under which the seizure or failure occurred it has not been possible to determine the cause for this type of failure. In testing transmissions of the type mentioned above, I have found that by running the transmission for extended periods of time in reverse that a seizure of the steel gear to the steel shaft can be caused. Apparently, running the transmission in reverse sets up a vibration in the shaft on which the gear is mounted, thereby setting up a vibration or "flutter" of the gear on the shaft which then causes a breakdown of lubrication between the gear and shaft, thereby resulting in a seizure of the gear to the shaft. I have found that by imposing an axial load on the gear so that there is no clearance between the ends of the gear and the members between which the gear is retained that the gear apparently is prevented from vibrating. Thus there is no breakdown of lubrication between the gear and shaft with the result that the seizure problem under this condition is eliminated.

Consequently, a principal object of my invention is to provide apparatus that imposes an axial loading on a gear mounted for rotation on a rotatable shaft in order to eliminate vibration of the gear on the shaft.

*Summary of the invention*

In carrying out my invention in a preferred embodiment thereof, I provide a gear mounted for rotation on a rotatable shaft and spring means for biasing the gear against a stop on the shaft.

The above and other objects, features and advantages of my invention will be more readily understood by persons skilled in the art when the following detailed description is taken in conjunction with the drawing.

*Brief description of the drawing*

FIGURE 1 is a longitudinal section of a gear transmission embodying my invention;

*Description of the preferred embodiment*

Figure 2:
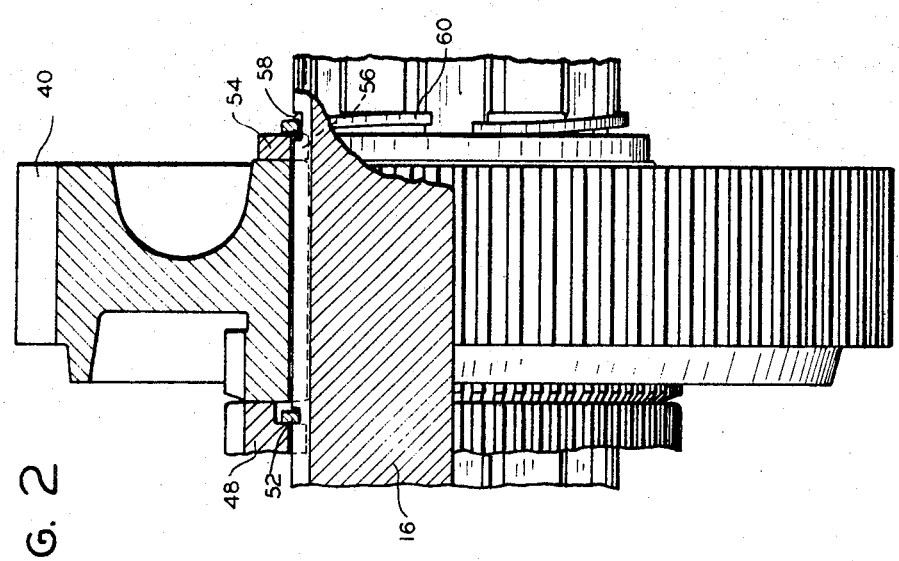
FIGURE 2 is an enlarged fragmentary view showing my invention to advantage.

Referring now to FIGS. 1 and 2, the reference numeral 10 denotes generally a multiple speed gear transmission including a housing 12, an input shaft 14, an output shaft 16, a countershaft 18 and an idler shaft 20. The shafts are journaled for rotation in housing 12 by suitable bearings and one end of output shaft 16 is partially telescoped in input shaft 14.

Integral with input shaft 14 is an input gear 22 which meshes with a gear 24 fixed to countershaft 18 so that countershaft 18 is driven by input shaft 14. Also connected to countershaft 18 for rotation therewith is a gear 26. Further, integral with countershaft 18 are three gears 28, 30 and 32.

Meshing with gear 26 is a gear 34 which is mounted for rotation on output shaft 16. Disposed between gears 22 and 34 is a double clutch 36 which is operable when shifted in one direction to connect shafts 14 and 16 for conjoint rotation and when shifted in the opposite direction is operable to connect gear 34 to shaft 16 for conjoint rotation therewith.

Meshing with gear 28 is a gear 38 which is mounted for rotation on output shaft 16, and meshing with gear 30 is a gear 40 which is mounted for rotation on output shaft 16. A double clutch 42 is disposed between gears 38 and 40 and is operable when shifted in one direction to connect gear 38 to output shaft 16 for conjoint rotation therewith and when shifted in the opposite direction is operable to connect gear 40 to output shaft 16 for conjoint rotation therewith.

A gear 44 is splined to output shaft 16 for conjoint rotation therewith and is slidable axially along output shaft 16 so that it may be positioned between gear 32 and an idler gear 46 or in mesh with either gear 32 or idler gear 46.

At this point it will be apparent that the above described transmission has five speeds forward and one in reverse. That is, first speed is provided by having gear 44 mesh with gear 32, second speed is engaged by clutching gear 40 to output shaft 16, third speed is engaged by clutching gear 38 to output shaft 16, fourth speed is engaged by clutching gear 34 to output shaft 16 and fifth gear is engaged by clutching output shaft 16 to input shaft 14. Reverse is obtained by having gear 44 mesh with idler gear 46, it being understood that idler gear 46 is shown rotated out of its true position.

As was pointed out hereinabove transmissions of this type occasionally fail without any clear reason. This failure occurs usually when gear 40, which is a steel gear running on a steel shaft, seizes to shaft 16. This condition apparently is brought about by vibration of shaft 16 caused by running the transmission for extended periods in reverse, for example, which results in a breakdown of the lubrication between gear 40 and shaft 16 with the result that gear 40 seizes on shaft 16.

In order to eliminate this problem of seizure of gear 40 to shaft 16 because of a breakdown in lubrication, I provide an arrangement whereby gear 40 is run on shaft 16 with no end clearance, and in fact with an axial loading on the gear. Previously, there was provided an end clearance between gear 40 and the positioning members on the shaft.

Referring now specifically to FIG. 2, it will be seen that clutch 42 includes a clutch hub 48 which is splined to shaft 16 and which is held from axial movement along shaft 16 by a pair of snap rings 50 and 52 positioned in grooves on shaft 16. Gear 40 abuts one end of hub 48 on one end and adjacent the other end of gear 40 a thrust washer 54 is disposed. Thrust washer 54 includes a tooth 56 which is disposed between two of the splines on shaft 16 so that thrust washer 54 is held from rotation, but is movable axially along shaft 16. Groove 58 in shaft 16 is located so that the end adjacent gear 40 extends under thrust washer 54 when gear 40 is in abutment with hub 48, as shown. A helical snap ring 60 is disposed in groove 58 and has a width less than groove 58. Because the ends of snap rings 60 must be moved toward each other, relative to the longitudinal axis of shaft 16, in order for snap ring 60 to be inserted into groove 58 there is a bias imposed on thrust washer 54 and gear 40, so that gear 40 is held in abutment with hub 48, and there is no clearance between gear 40 and either hub 48 or thrust washer 54. I have found that an axial force of about 7 pounds imposed on gear 40 by snap ring 60 is sufficient to dampen any vibration that otherwise would occur in gear 40, but yet is small enough to prevent any wear or overheating problems when gear 40 is spinning rapidly on shaft 16. While it is desirable to have thrust washer 54 positioned between snap ring 60 and gear 40, it is not necessary and thrust washer 54 may be dispensed with, if desired.

*Description of modification*

Figure 3:
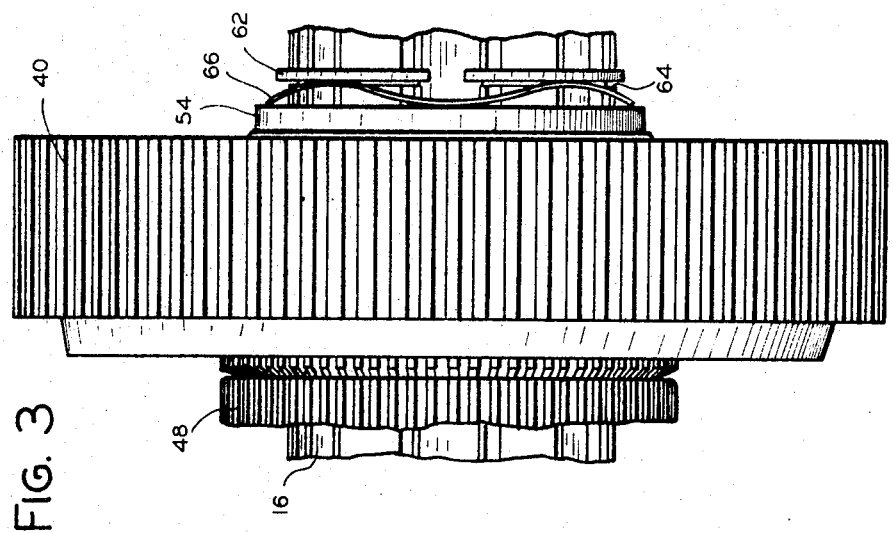
FIGURE 3 is similar to FIG. 2 and shows a modification of my invention.

Referring now to FIG. 3, a modification of my invention will be described. This modification is generally similar to the embodiment shown in FIG. 2, and so to the extent that the above detailed description is applicable, reference will be made here to it, like reference numerals being applied to like parts. In this modification the resilient bias which is applied to gear 40 to move it into abutment with hub 48 is supplied by means of a conventional snap ring 62 which is disposed in a groove 64 in shaft 16 and an annular resilient wave washer 66 which is disposed between snap ring 62 and thrust washer 54, wave washer 66 being compressed somewhat in order to provide the desired loading on gear 40.

The above detailed description is intended to be illustrative only, and while only two embodiments of my invention have been shown, it will be understood that my invention is subject to various modifications and changes without departing from the scope and spirit of it. Consequently, the limits of my invention should be determined from the following claims.

I claim:
1. The combination comprising a rotatable shaft, a stop fixed to the said shaft, a gear mounted for rotation on the said shaft, and means for resiliently biasing the said gear into abutment with the said stop, the said biasing means including a groove in the said shaft, the said groove having one side disposed under the said gear, and a helical snap ring disposed in the said groove, the width of the said snap ring being less than the width of the said groove.

2. The combination as set forth in claim 1 wherein the said stop is a clutch hub fixed to the said shaft.

3. In a transmission having an output shaft, a countershaft, first and second gears rotatable with the said countershaft, an idler gear meshing with the second gear, and a reverse gear mounted on the output shaft and drivable through the idler gear, the improvement comprising a stop mounted on the output shaft, a third gear mounted for rotation on the output shaft and in mesh with the first gear, and means for resiliently biasing the said third gear against the said stop, the said biasing means including a groove in the output shaft, the said groove having one side disposed under the said third gear, and a helical snap ring disposed in the said groove, the width of the said snap ring being less than the width of the said groove.

4. The improvement as set forth in claim 3 wherein the said stop is a clutch hub fixed to the output shaft.

References Cited

UNITED STATES PATENTS

| | | | |
|---|---|---|---|
| 2,096,304 | 10/1937 | Lapsley | 74—325 |
| 2,800,800 | 7/1957 | Dunn | 74—325 |
| 3,093,007 | 6/1963 | Aebersold | 74—325 |
| 3,115,048 | 12/1963 | Cape | 74—363 X |
| 3,293,931 | 12/1966 | Beattie | 74—325 |

ARTHUR T. McKEON *Primary Examiner.*

U.S. Cl. X.R.

74—325, 443